United States Patent
Li et al.

(10) Patent No.: US 12,312,698 B2
(45) Date of Patent: May 27, 2025

(54) METHOD AND DEVICE FOR PREPARING TRIVALENT CHROMIUM SALT BY ELECTROCHEMICAL OXIDATION OF FERROCHROME IN ACIDIC SYSTEM

(71) Applicant: QINGHAI INSTITUTE OF SALT LAKES, CHINESE ACADEMY OF SCIENCES, Xining (CN)

(72) Inventors: Bo Li, Xining (CN); Haitao Feng, Xining (CN); Yaping Dong, Xining (CN); Xinqian Li, Xining (CN); Shuqi Li, Xining (CN); Zhengrong Niu, Xining (CN); Wu Li, Xining (CN)

(73) Assignee: QINGHAI INSTITUTE OF SALT LAKES, CHINESE ACADEMY OF SCIENCES, Xining (CN)

( * ) Notice: Subject to any disclaimer, the term of this patent is extended or adjusted under 35 U.S.C. 154(b) by 0 days.

(21) Appl. No.: 18/723,891

(22) PCT Filed: Apr. 23, 2023

(86) PCT No.: PCT/CN2023/090141
§ 371 (c)(1),
(2) Date: Jun. 25, 2024

(87) PCT Pub. No.: WO2024/130918
PCT Pub. Date: Jun. 27, 2024

(65) Prior Publication Data
US 2025/0109508 A1  Apr. 3, 2025

(30) Foreign Application Priority Data

Dec. 23, 2022  (CN) .................. 202211671770.X

(51) Int. Cl.
*C25B 1/24* (2021.01)
*C22B 3/04* (2006.01)
(Continued)

(52) U.S. Cl.
CPC ............... *C25B 1/24* (2013.01); *C22B 3/045* (2013.01); *C22B 3/06* (2013.01); *C25B 11/046* (2021.01); *C25B 15/083* (2021.01); *C25B 15/085* (2021.01)

(58) Field of Classification Search
None
See application file for complete search history.

(56) References Cited

U.S. PATENT DOCUMENTS 1,492,636 A * 5/1924 Jouve .................. C01G 37/14
                                                                 205/483
1,838,777 A   12/1931 McCullough et al.
(Continued)

FOREIGN PATENT DOCUMENTS

CN     103210125 A    7/2013
CN     103643251 A    3/2014
(Continued)

OTHER PUBLICATIONS

PCT Written Opinion for application PCT/CN2023/090140, Aug. 2023 (Year: 2023).*
(Continued)

*Primary Examiner* — Harry D Wilkins, III
(74) *Attorney, Agent, or Firm* — Bayramoglu Law Offices LLC

(57) ABSTRACT

A method and a device for preparing a trivalent chromium salt by electrochemical oxidation of ferrochrome in an acidic system are provided. The method includes: putting ferrochrome as an anode and placing the anode into an acidic electrolyte together with a cathode, and then turning on a power supply for electrolysis reaction, until an electrolysis completion solution containing the trivalent chromium salt and a trivalent iron salt is directly prepared. Compared with the prior art, the one-step electrochemical synthesis of the trivalent chromium salt solution can be achieved without a
(Continued)

hexavalent chromium salt stage, avoiding the generation of chromium-containing waste residue, shortening the process flow and significantly improving the production efficiency of the trivalent chromium salt; furthermore, the reaction can be carried out at room temperature and normal pressure without the use of fine chromium iron powders and a high-concentration acidic electrolyte.

5 Claims, 1 Drawing Sheet

(51) Int. Cl.
  *C22B 3/06* (2006.01)
  *C25B 11/046* (2021.01)
  *C25B 15/08* (2006.01)

(56) References Cited

U.S. PATENT DOCUMENTS

| | | | | |
|---|---|---|---|---|
| 1,878,918 | A * | 9/1932 | Udy | C01G 37/033 205/487 |
| 2,988,492 | A | 6/1961 | Yoshida | |
| 4,393,029 | A * | 7/1983 | Heimala | C01G 37/02 423/55 |
| 2011/0162974 | A1 * | 7/2011 | Kuwano | B82Y 30/00 423/607 |
| 2011/0168299 | A1 * | 7/2011 | Hoshino | B82Y 30/00 148/267 |
| 2012/0118749 | A1 * | 5/2012 | Pearson | C25D 21/18 205/101 |

FOREIGN PATENT DOCUMENTS

| | | |
|---|---|---|
| CN | 103668301 A | 3/2014 |
| CN | 106148706 A | 11/2016 |
| CN | 106244804 A | 12/2016 |
| CN | 106399688 A | 2/2017 |
| CN | 107620106 A | 1/2018 |
| CN | 109208019 A | 1/2019 |
| CN | 110734089 A | 1/2020 |
| CN | 115976535 A | 4/2023 |
| GB | 292094 A | 8/1929 |
| GB | 771695 A | 4/1957 |
| GB | 1388204 A | 3/1975 |
| JP | H08120500 A | 5/1996 |

OTHER PUBLICATIONS

Partial English translation of Chao Li NPL (Year: 2014).*
Chao Li, Research on Anode Eletrochemical Dissolution of High-Carbon Ferrochrome and Electrodeposition of Chromium in an Ion-Exchange Membrane Reactor, Dissertation for the Master Degree in Science, 2015, pp. 1-77.

* cited by examiner

METHOD AND DEVICE FOR PREPARING TRIVALENT CHROMIUM SALT BY ELECTROCHEMICAL OXIDATION OF FERROCHROME IN ACIDIC SYSTEM

CROSS REFERENCE TO THE RELATED APPLICATIONS

This application is the national phase entry of International Application No. PCT/CN2023/090141, filed on Apr. 23, 2023, which is based upon and claims priority to Chinese Patent Application No. 202211671770.X, filed on Dec. 23, 2022, the entire contents of which are incorporated herein by reference.

TECHNICAL FIELD

The present application relates to a production method of a trivalent chromium salt, and particularly to a method and device for preparing a trivalent chromium salt by electrochemical oxidation of ferrochrome in an acidic system, belonging to the technical field of cleaning chemical industry.

BACKGROUND

A chromium salt is one of key series products in inorganic industry, which is widely applied to the industrial fields of metallurgy, leather making, pigments, dyes, spices, metal surface treatment, wood preservation, military industry and the like.

The existing chromium salt production process is mainly a hexavalent chromium process route, including a calcium-free roasting process using chromite as a raw material, a sub-molten salt alkaline oxidation process, or high-temperature liquid-phase oxidation using chromite as a raw material, and then producing a trivalent chromium salt or a trivalent chromium compound using the obtained hexavalent chromium compound as a parent material. These processes, on the one hand, inevitably cause hexavalent chromium pollution, and on the other hand, prolong the process flow and increase production costs.

To solve hexavalent chromium pollution and other problems, direct preparation of a trivalent chromium salt or a trivalent chromium compound by chromite or ferrochrome is an important way to green development of chromium salt industry. A production method of a trivalent chromium salt proposed by researchers comprises: carrying out sulfuric acid high-temperature stirring and leaching based on ferrochrome powders as a raw material, removing iron by an oxalic acid iron removal method to obtain a chromium sulfate solution containing low impurity content, then adjusting the pH value of the chromium sulfate solution to obtain a chromium hydroxide precipitate and then obtain a chromium sesquioxide product. However, the method has relatively high production efficiency and yield as long as multiple conditions are at least met, for example, (1) it is necessary to smash and grind ferrochrome powders into fine powders in advance, otherwise the dissolution reaction will be hindered due to the passivation effect of ferrochrome in an acidic solution, and even if the ferrochrome powder is used as the raw material, it cannot completely overcome the passivation effect, and the conversion rate of ferrochrome is still low; (2) a high-concentration acid must be used, especially the concentration of hydrogen ions is generally higher than 10 mol/L, otherwise the efficiency of the dissolution reaction will be very low; 3 the reaction system must be heated to a relatively high temperature in order to significantly improve the decomposition rate and dissolution efficiency of ferrochrome, which limits its application in volatile acidic systems such as hydrochloric acid and nitric acid or other acidic systems with relatively poor thermal stability. Therefore, when being implemented, this method is high in process cost and energy consumption and difficultly controlled in reaction process, and easily causes equipment corrosion and acid mist.

SUMMARY

The main objective of the present application is to provide a method and device for preparing a trivalent chromium salt by electrochemical oxidation of ferrochrome in an acidic system in order to overcome the defects in the prior art.

In order to achieve the above objective of the present disclosure, the technical solution adopted by the present application is as follows.

One aspect of the present application provides a method for preparing a trivalent chromium salt by electrochemical oxidation of ferrochrome in an acidic system, comprising: putting ferrochrome as an anode and placing the anode into an acidic electrolyte together with a cathode, then turning on a power supply for electrolysis reaction, until an electrolysis completion solution containing the trivalent chromium salt and a trivalent iron salt is directly prepared. And then, the electrolysis completion solution is posttreated by evaporative crystallization and other methods, so as to obtain a trivalent chromium salt product through separation.

Another aspect of the present application provides a device for preparing a trivalent chromium salt by electrochemical oxidation of ferrochrome in an acidic system, comprising an anode, a cathode, an electrolytic tank and a power supply, wherein the anode is ferrochrome, and the electrolytic tank is used for accommodating an acidic electrolyte; after the anode, the cathode, the acidic electrolyte and the power supply are combined to form an electrolysis reaction system and the electrolysis reaction is carried out, an electrolysis completion solution containing the trivalent chromium salt and the trivalent iron salt is directly prepared.

Compared with the prior art, the present application at least has the following advantages:

(1) In the present application, industrial ferrochrome can be used as an anode material, the preparation of the trivalent chromium salt is carried out by using an electrolysis method, the trivalent chromium salt solution is synthesized in one step without a hexavalent chromium process during the electrolysis, and no chromium pollution is generated.

(2) In the present application, the entire electrolysis reaction process can be carried out at room temperature and normal pressure, so the method of the present application is mild in reaction condition, low in equipment requirement, and low in energy consumption.

(3) In the present application, the passivation effect of ferrochrome in the acidic system can be overcome, no special requirements are made to ferrochrome shape and size, and the method of the present application has high reaction selectivity, rapid and uniform reaction speed, high ferrochrome conversion rate, especially high chromium recovery rate, and atom economy.

(4) In the present application, the reaction still can be carried out smoothly in a low-concentration acidic solution, and a high-concentration acidic solution is not required, so acid mist and equipment corrosion are reduced.

(5) In the present application, the reaction process can implement automation continuous control, especially the reaction can be timely initiated or stopped according to actual situations, with flexible manipulation.

BRIEF DESCRIPTION OF THE DRAWINGS

The accompanying drawings of the specification, which form a part of the present application, are used to provide a further understanding of the present application. The illustrative embodiments and their explanations of the present application are used to explain the present application and do not constitute an improper limitation to the present application.

DETAILED DESCRIPTION OF THE EMBODIMENTS

Figure 1:
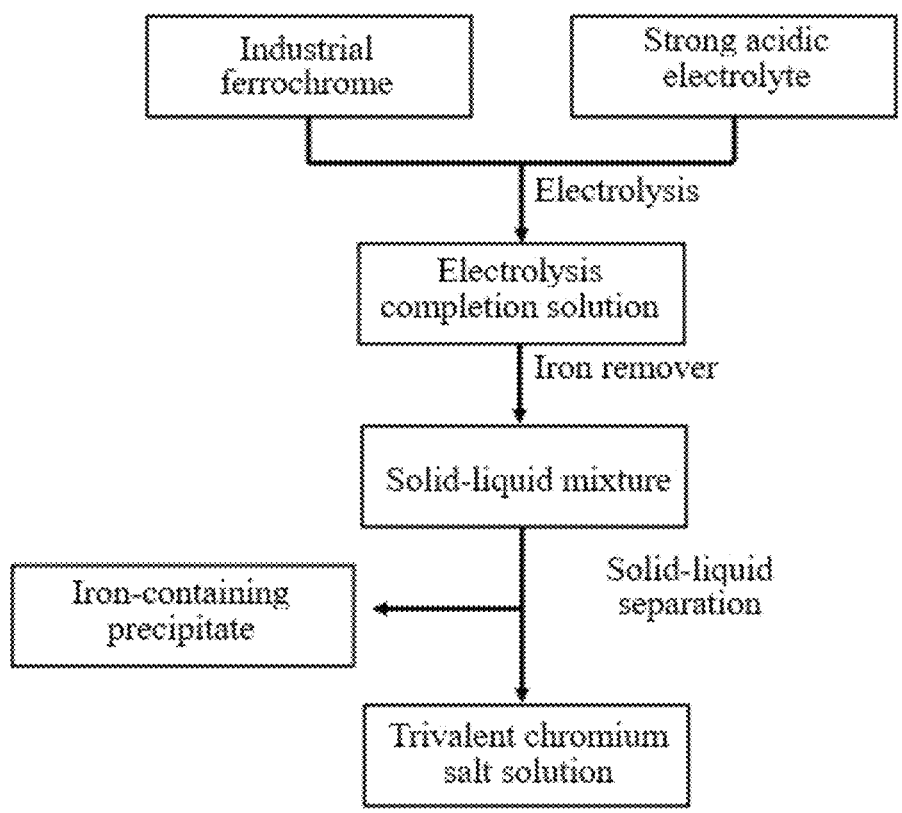
FIG. 1 is a process flowchart of preparing a trivalent chromium salt by electrochemical oxidation of ferrochrome in an acidic system according to an embodiment of the present application.

In view of the defects in the prior art, the inventor proposes the technical solution of the present application via long-term researches and practice. Next, the technical solution will be described in detail.

Some embodiments of the present application provide a method for preparing a trivalent chromium salt by electrochemical oxidation of ferrochrome in an acidic system, comprising: putting ferrochrome as an anode and placing the anode into an acidic electrolyte together with a cathode, then turning on a power supply for electrolysis reaction, until an electrolysis completion solution containing the trivalent chromium salt and a trivalent iron salt is directly prepared.

In one embodiment, the ferrochrome can adopt industrial ferrochrome such as high-carbon ferrochrome, medium-carbon ferrochrome, low-carbon ferrochrome, micro-carbon ferrochrome, and ultrafine carbon ferrochrome, or alloy materials such as silicon chromium alloy and stainless steel, preferably industrial ferrochrome, because it is cheap and easily available, etc.

In one embodiment, the ferrochrome can be in multiple shapes, such as a block, a sheet, a film and powder, and is not limited thereto.

In one embodiment, the concentration of hydrogen ions in the acidic electrolyte is 0.1 mol/L-5 mol/L, preferably 0.5 mol/L-5 mol/L, more preferably 1 mol/L-3 mol/L. Furthermore, the acidic electrolyte preferably adopts a strong acid solution, for example a combination of one or more of a hydrochloric acid solution, a sulfuric acid solution and a nitric acid solution, but is not limited thereto.

In one embodiment, the power supply is a direct-current power supply. Further, according to actual application demands, an ampere meter, a voltmeter, a current intensity adjustment mechanism (such as a variable resistor) can also be correspondingly set according to a method well-known in the art.

In one embodiment, the method also comprises: when the electrolysis reaction is carried out, the current density of the anode is 500-3000 A/m².

In one embodiment, the electrolysis reaction is carried out under the conditions that a temperature is less than 100° C. and a pressure is about 1 am, preferably at room temperature and normal pressure.

In one embodiment, the method also comprises a step of posttreating the electrolysis completion solution.

For example, the electrolysis completion solution can be subjected to evaporative crystallization to prepare the trivalent chromium salt product.

Alternatively, an iron remover can also be added into the electrolysis completion solution to at least remove a part of trivalent iron salt in the electrolysis completion solution, and then the electrolysis completion solution is subjected to evaporative crystallization to prepare the trivalent chromium salt product.

Where, the iron remover can select, but is not limited to a combination of any one or more of oxalic acid, sodium oxalate and aqueous ammonia.

In one embodiment, the material of the cathode comprises stainless steel or nickel, etc., and is not limited thereto.

In a specific embodiment of the present application, refer to FIG. 1, the method specifically comprises:
providing an electrolysis device, comprising an electrolysis tank, a power supply, industrial ferrochrome as an anode, and a cathode;
placing the industrial ferrochrome and the cathode in the electrolysis tank, wherein the electrolysis tank accommodates a strong acidic electrolyte, and the industrial ferrochrome and the cathode are both partially or completely immersed into the strong acidic electrolyte; and
respectively electrically connecting the industrial ferrochrome and the cathode with a positive electrode and a negative electrode of the power supply so as to carry out electrolysis reaction and then obtain an electrolysis completion solution containing a trivalent chromium salt and a trivalent iron salt in the electrolysis tank.

Where, the reaction equation of the electrolysis reaction is as follows:
anode reaction: $Cr-3e \rightarrow Cr^{3+}$, $Fe-3e \rightarrow Fe^{3+}$
cathode reaction: $2H_2O+2e \rightarrow H_2 \uparrow +2OH^-$
total reaction: $Cr+Fe+6H_2O \rightarrow Cr^{3+}+Fe^{3+}+3H_2 \uparrow +6OH^-$ That is, in the process of electrooxidation, chromium in the industrial ferrochrome is converted into a soluble trivalent chromium salt, and iron is converted into a soluble trivalent iron salt.

In the process of electrolysis reaction, the electrolysis reaction is initiated or stopped by turning on or off the power supply according to actual needs, or the speed of the electrolysis reaction is increased or reduced by increasing or reducing the current density.

After the electrolysis reaction is ended, the electrolysis completion solution can be directly subjected to evaporative crystallization to obtain a trivalent chromium salt product with a certain purity; or, most of the soluble trivalent iron salt in the electrolysis completion solution is converted into an iron-containing precipitate and the like by adding the iron remover into the electrolysis completion solution, and the obtained iron-containing precipitate is removed through a simple method such as static settlement or filtration so as to obtain a trivalent chromium salt solution with relatively high purity, and then the trivalent chromium salt solution is subjected to evaporative crystallization to obtain the trivalent chromium salt product with relatively high purity.

Some embodiments of the present application also provide a device for preparing a trivalent chromium salt by electrochemical oxidation of ferrochrome in an acidic system, comprising an anode, a cathode, an electrolytic tank and a power supply, wherein the anode is ferrochrome, and the electrolytic tank is used for accommodating an acidic electrolyte; after the anode, the cathode, the acidic electrolyte and the power supply are combined to form an electrolysis reaction system and the electrolysis reaction is carried out, an electrolysis completion solution containing a trivalent chromium salt and a trivalent iron salt is directly prepared.

Further, in the electrolysis reaction system, the anode and the cathode are both partially or completely immersed into the acidic electrolysis solution, and the anode and the cathode are electrically connected with the positive electrode and the negative electrode of the power supply, respectively.

In one embodiment, the material of the cathode comprises stainless steel or nickel, etc., and is not limited thereto.

In addition, the device also comprises other auxiliary mechanisms that can be used or not used, for example a stirring mechanism, a temperature detection mechanism, a temperature adjusting mechanism, a pH value detection mechanism, and are not limited thereto. The use methods of these auxiliary mechanisms are all well-known in the art, and described in detail here.

By utilizing the method provided by the present application, the trivalent chromium salt solution can be electrochemically synthesized in one step, a hexavalent chromium salt stage is not required, avoiding the generation of chromium-containing waste residue, shortening the process flow and significantly improving the production efficiency of the trivalent chromium salt. Furthermore, the reaction can be carried out at room temperature and normal pressure without the use of fine ferrochrome powders and a high-concentration acidic electrolyte. The method of the present application is mild in reaction condition, low in energy consumption, high in chromium conversion rate and efficiency, controllable in reaction process, low in equipment corrosion, green and environmental-friendly, and has good application prospects in the fields of cleaning and chemical industry.

Next, the technical solutions in embodiments of the present application will be clearly and completely described in combination with drawings in embodiments of the present application, obviously, the described embodiments are only some embodiments of the present application, but are not all the embodiments. Unless stated otherwise, various raw materials and devices used in the following examples can all be commercially available, various test methods and test equipment and the like adopted are all common in the art.

Example 1

Figure 2:
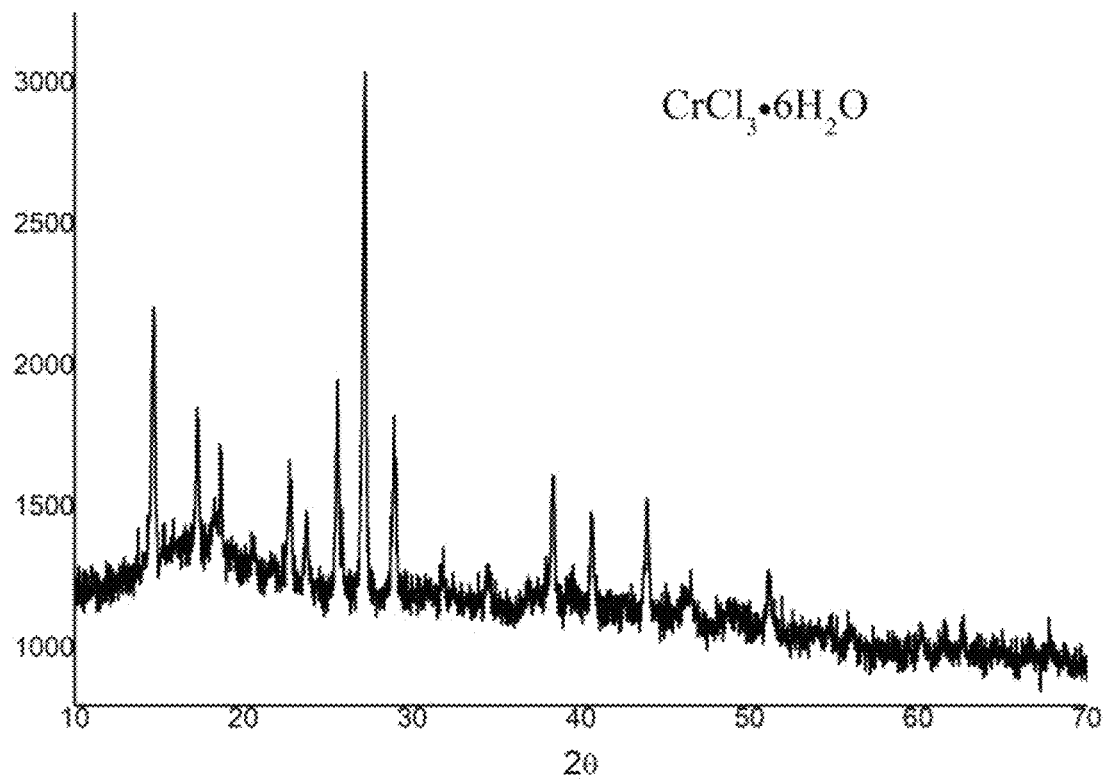
FIG. 2 is an X-ray diffraction (XRD) graph of $CrCl_3 \cdot 6H_2O$ produced in example 1 of the present application.

A HCl solution having a concentration of about 1.0 mol/L, as an acidic electrolyte, was injected into an electrolytic tank, and a commercially available low-carbon ferrochrome irregular block material and a stainless steel sheet, respectively serving as an anode and a cathode, were immersed into the acidic electrolyte, and the anode and the cathode were electrically connected with a positive electrode and a negative electrode of a direct-current power supply respectively. At a temperature of about 25° C. (the temperature of the acidic electrolyte) and a pressure of about 1 atm, the direct-current power supply supplied a direct current to the anode and the cathode so that the current density on the anode was about 600 A/m$^2$, the reaction was terminated after the electrolysis reaction was carried out for 5 h to obtain an electrolysis completion solution containing $CrCl_3$ and $FeCl_3$, wherein the concentration of $CrCl_3$ was about 7.30 g/L, and the concentration of FeCl; was about 3.91 g/L. By calculation, in this example, the conversion rate of Cr was about 0.21 g/A·h, the conversion rate of Fe was about 0.12 g/A·h, the conversion efficiency of Cr was about 96.98%, and the conversion efficiency of Fe was about 99.60%. The electrolysis completion solution was subjected to slow evaporative crystallization to obtain a $CrCl_3·6H_2O$ product. Its XRD characterization results are as shown in FIG. 2.

Example 2

A $H_2SO_4$ solution having a concentration of about 0.5 mol/L, as an acidic electrolyte, was injected into an electrolytic tank, and a commercially available high-carbon ferrochrome irregular block material and a stainless steel sheet, respectively serving as an anode and a cathode, were immersed into the acidic electrolyte, and the anode and the cathode were electrically connected with a positive electrode and a negative electrode of a direct-current power supply respectively. At a temperature of about 55° C. (the temperature of the acidic electrolyte) and a pressure of about 1 atm, the direct-current power supply supplied a direct current to the anode and the cathode so that the current density on the anode was about 3000 A/m$^2$, the reaction was terminated after the electrolysis reaction was carried out for 5 h to obtain an electrolysis completion solution containing $Cr_2(SO_4)_3$ and $Fe_2(SO_4)_3$, wherein the concentration of $Cr_2(SO_4)_3$ was 74.67 g/L, and the concentration of $Fe_2(SO_4)_3$ was about 46.51 g/L. By calculation, in this example, the conversion rate of Cr was about 0.19 g/A·h, the conversion rate of Fe was about 0.13 g/A·h, the conversion efficiency of Cr was about 81.06%, and the conversion efficiency of Fe was about 97.27%. The electrolysis completion solution was subjected to evaporative crystallization to obtain $Cr_2(SO_4)_3$.

Example 3

A HCl solution having a concentration of about 3 mol/L, as an acidic electrolyte, was injected into an electrolytic tank, and a commercially available medium-carbon ferrochrome irregular block material and a stainless steel sheet, respectively serving as an anode and cathode, were immersed into the acidic electrolyte, and the anode and the cathode were electrically connected with a positive electrode and a negative electrode of a direct-current power supply respectively. At a temperature of about 35° C. (the temperature of the acidic electrolyte) and a pressure of about 1 atm, the direct-current power supply supplied a direct current to the anode and the cathode so that the current density on the anode was about 1200 A/m$^2$, the reaction was terminated after the electrolysis reaction was carried out for 5 h to obtain an electrolysis completion solution containing $CrCl_3$ and $FeCl_3$, wherein the concentration of $CrCl_3$ was 32.00 g/L, and the concentration of $FeCl_3$ was about 24.84 g/L. By calculation, in this example, the conversion rate of Cr was about 0.26 g/A·h, the conversion rate of Fe was about 0.14 g/A·h, the conversion efficiency of Cr was about 98.98%, and the conversion efficiency of Fe was about 99.50%.

After that, oxalic acid with a stoichiometric ratio being about 1.20 folds was added in the electrolysis completion solution so that the removal rate of $Fe^{3+}$ in the electrolysis completion solution was about 97.90%, the total recovery rate of Cr in a liquid phase was about 96.50%, a $CrCl_3$ solution with a higher purity was obtained, and then $CrCl_3·6H_2O$ with a purity of about 98.0% was obtained by evaporative crystallization.

Comparative Example 1

A commercially available low-carbon ferrochrome irregular block material was smashed to form fine particles with a particle size of less than 75 μm, then a $H_2SO_4$ solution with a temperature of 90° C. and a concentration of about 9 mol/L was added, and the above materials were continuously stirred at the speed of 300 r/min. After reacting for 8 h at normal pressure, an acidic leaching solution containing $Cr_2(SO_4)_3$ and $FeSO_4$ was obtained, wherein the concentration of $Cr_2(SO_4)_3$ was about 203 g/L, and the concentration of $FeSO_4$ was about 64 g/L. By calculation, in this comparative example, the conversion rate of Cr was about 6.60 g/h, the conversion rate of Fe was about 2.96 g/h, the conversion efficiency of Cr was about 87%, and the conversion efficiency of Fe was about 85%. This method can generate a large amount of pollutants such as sulfur dioxide in the process of reaction, and the amount of sulfuric acid needs to be excessive, about 10% or above.

Although the present application has been described with reference to illustrative embodiments, those skilled in the art will understand that various other changes, omissions, and/or additions may be made without departing from the spirit and scope of the present application, and substantial equivalents may be used to replace the substances or components of the embodiments. In addition, many modifications can be made without departing from the scope of the present application to adapt specific situations or materials to the teachings of this application. Therefore, this article does not intend to limit the present application to the specific embodiments disclosed for executing the present application, but rather intends to include all embodiments belonging to the scope of the attached claims in the present application.

What is claimed is:

1. A method for preparing a trivalent chromium salt by an electrochemical oxidation of ferrochrome in an acidic system, comprising: putting the ferrochrome as an anode and placing the anode into an acidic electrolyte together with a cathode, and then turning on a power supply for an electrolysis reaction at room temperature and normal pressure to directly prepare an electrolysis completion solution comprising the trivalent chromium salt and a trivalent iron salt; and subjecting the electrolysis completion solution to an evaporative crystallization to prepare a trivalent chromium product, wherein, a concentration of hydrogen ions in the acidic electrolyte is 0.1 mol/L-5 mol/L; and when the electrolysis reaction is carried out, a current density of the anode is 500-3000 $A/m^2$.

2. The method according to claim 1, wherein the acidic electrolyte is at least one selected from the group consisting of a hydrochloric acid solution, a sulfuric acid solution, and a nitric acid solution.

3. The method according to claim 1, comprising: adding an iron remover into the electrolysis completion solution to at least remove a part of the trivalent iron salt in the electrolysis completion solution to obtain a resulting electrolysis completion solution, and then carrying out an evaporative crystallization on the resulting electrolysis completion solution to prepare a trivalent chromium salt product.

4. The method according to claim 3, wherein the iron remover is at least one selected from the group consisting of oxalic acid, sodium oxalate, and aqueous ammonia.

5. The method according to claim 1, wherein a material of the cathode comprises stainless steel or nickel.

* * * * *